United States Patent [19]

Rogier

[11] Patent Number: 4,496,017

[45] Date of Patent: Jan. 29, 1985

[54] WHEEL HUB ASSEMBLY WITH INTEGRATED REDUCTION GEAR AND BRAKE MECHANISM

[75] Inventor: Léonce Rogier, Saint-Denis, France

[73] Assignee: Valeo, Paris, France

[21] Appl. No.: 451,441

[22] Filed: Dec. 20, 1982

[30] Foreign Application Priority Data

Dec. 22, 1981 [FR] France ............................. 81 23949

[51] Int. Cl.³ ................... F16D 55/02; F16D 65/84
[52] U.S. Cl. .............................. 180/70.1; 180/75; 188/264 B; 188/264 D
[58] Field of Search ................... 180/70, 75, 88; 188/264 R, 264 B, 264 D, 71.6

[56] References Cited

U.S. PATENT DOCUMENTS

| | | | |
|---|---|---|---|
| 1,860,375 | 5/1932 | Winterer et al. | 188/264 B |
| 3,301,359 | 1/1967 | Cole et al. | 192/4 R |
| 4,113,067 | 9/1978 | Coons et al. | 188/71 |
| 4,140,198 | 2/1979 | Chamberlain | 180/75 |

FOREIGN PATENT DOCUMENTS 1205902  2/1960  France .
1253179  11/1971  United Kingdom .

Primary Examiner—Richard A. Bertsch
Attorney, Agent, or Firm—Charles E. Brown

[57] ABSTRACT

A wheel hub assembly for heavy-duty vehicles comprises a hollow body containing a liquid lubricant having a first compartment housing wheel drive reduction gear and a second compartment adjacent the first compartment housing a wheel brake mechanism. A portion of the sidewall of the hollow body annularly surrounds one of the compartments (preferably the second) and comprises at least one pair of longitudinally extending, oppositely sloping generally oblique grooves for circulating the lubricant between the compartments. The grooves of each pair are preferably symmetrical. Grooves sloping in a first direction are arranged along a first semi-circumferential zone and the grooves sloping in the opposite direction are arranged in a second semi-circumferential zone. In the illustrated embodiment and annular interior wall separates the compartments and comprises a planetary pinion carrier and has channels in alignment with the oblique grooves for carrying liquid between the oblique grooves and the first compartment. The depth of the grooves may vary in accordance with the circumferential position thereof.

7 Claims, 4 Drawing Figures

WHEEL HUB ASSEMBLY WITH INTEGRATED REDUCTION GEAR AND BRAKE MECHANISM

The present invention relates generally to wheel hub assemblies particularly for heavy-duty vehicles such as trucks, industrial vehicles, agricultural vehicles and earth-moving equipment, and more particularly to wheel hub assemblies comprising a hollow body.

Known hollow body wheel hub assemblies contain a liquid lubricant and comprise a first compartment housing wheel drive reduction gear and a second compartment adjacent to and communicating with the first compartment housing a brake mechanism. In such a wheel hub assembly advantage is taken of the presence of a liquid lubricant, normally provided for lubricating the wheel drive reduction gear for cooling, in operation, the associated brake mechanism.

Yet, in practice, it has frequently been observed that there is little or no circulation of the liquid lubricant between the first compartment housing the reduction gear and the second compartment housing the associated brake mechanism. This is all the more so since most often the first compartment is separated from the second compartment by an annular internal wall for supporting the planet pinions or gears of the reduction gear and the liquid lubricant can only partially fill the compartments to prevent an excessive loss of power by the circulation of the lubricant in use and also to prevent leaks which owing to thermal expansion would otherwise be inevitable if the hollow body were completely filled. Owing to centrifugation two separate liquid "rings" result which are isolated from each other on opposite sides of the annular internal wall.

Now, although the temperature in the first compartment in which the reduction gear is housed is always rather moderate, of the order of 40° C., particularly because that compartment has a greater amount of liquid lubricant, such is not the case with the second compartment which houses the brake mechanism where the temperature may, on the contrary, reach relative high levels, of the order of 110° C., particularly because of the thermal energy given off during braking. This produces the dual risk of a possible destruction of the friction linings of the brake mechanism which are not properly cooled and overheating some of the liquid lubricant which may cause deterioration thereof.

The object of the present invention is to provide an arrangement capable of overcoming this drawback.

According to the invention there is provided a wheel hub assembly for heavy-duty vehicles, the wheel hub assembly comprising a hollow body containing, in use, a liquid lubricant and having a first compartment for housing wheel drive reduction gear and a second compartment adjacent to the first compartment and housing a wheel brake mechanism, at least a portion of the sidewall of the hollow body which annularly surrounds one of the compartments has at least a pair of longitudinally extending, oppositely sloping generally oblique grooves for longitudinally circulating the liquid lubricant between the compartments when the wheel hub assembly is in operation.

Preferably, there are a plurality of pairs of oblique grooves, one groove of each of the pairs sloping in a first direction and the other groove of each of the pairs sloping in a second or opposite direction, the said one grooves being spaced circumferentially along a first semi-circumferential zone and the said other grooves being spaced circumferentially along a second semi-circumferential zone opposite the first semi-circumferential zone.

In any event the grooves act as endless worms in opposite directions, the liquid lubricant is necessarily taken up by the grooves when the liquid is centrifuged into "rings" since the grooves are formed along the inner surface of the sidewall of the hollow body where the liquid rings are formed. The grooves sloping in the first direction ensure the forward flow of the lubricant and the grooves sloping in the second or opposite direction the return flow of the lubricant between the respective compartments.

Such an arrangement provides between the compartments of the hollow body of the wheel assembly a systematic flow of liquid lubricant which tends to average the temperatures in the compartments for the benefit of the cooling of the second compartment which houses the brake mechanism. The improved circulation of lubricant between the compartments works for forward or reverse movement of the vehicle with which it is equipped. In the case of reverse movement of the vehicle the above-described functions of the grooves are reversed.

These and other features and advantages of the invention will be brought out in the description which follows, given by way of example, with reference to the accompanying schematic drawings, in which.

Figure 1:
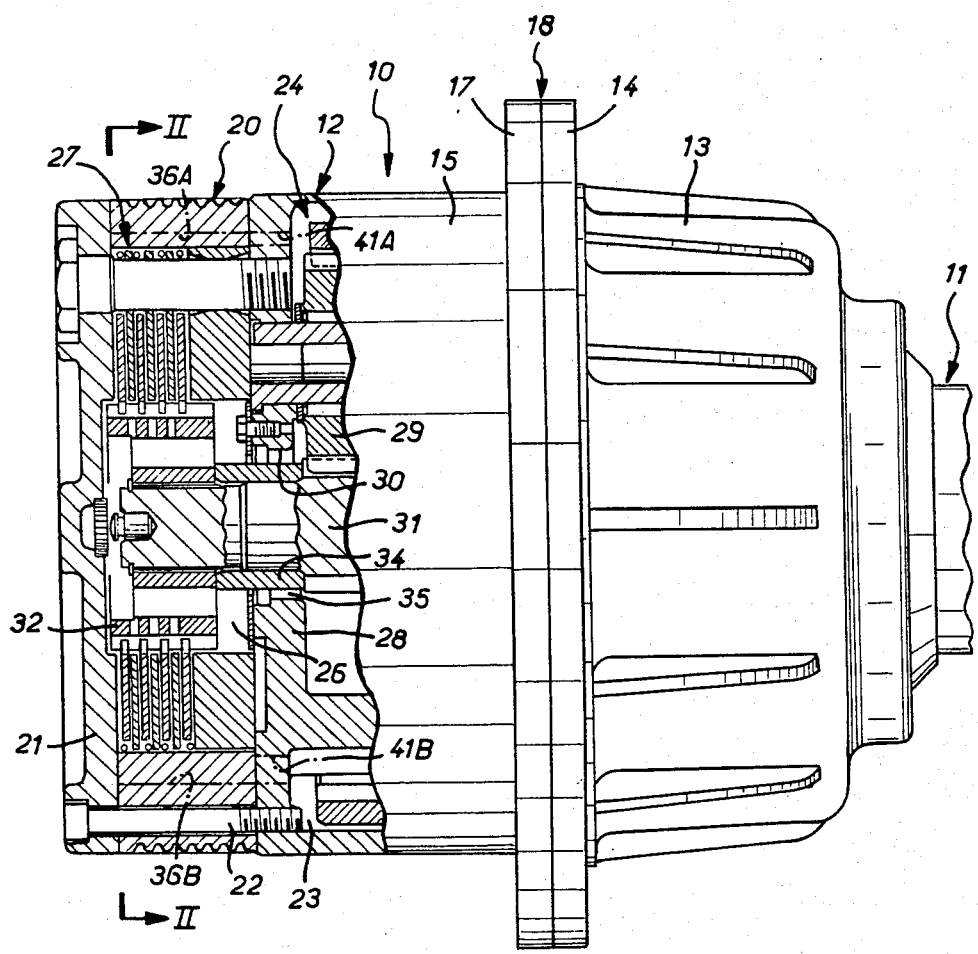
FIG. 1 shows a view, partly in elevation and partly in longitudinal section, taken along broken line I—I in FIG. 2, of a wheel hub assembly embodying the invention.

As shown in the drawings the wheel hub assembly 10 is adapted to be installed at the end of a stub axle 11 and comprises a hollow generally bell-shaped body which contains, in use, a liquid lubricant (not shown). In practice, the sidewall of the hollow body comprises three parts.

To begin with, a first part 13 which defines the actual wheel hub which is mounted on the free end of the stub axle 11 by means of anti-friction bearings, not shown in the drawings. The first part 13 comprises at its axial end remote from the stub axle 11 a transverse flange 14. A second part 14 comprises, in contact with the flange 14, a transverse flange 17 to which it is secured by threaded fasteners (not shown), the combined radial flange 18 defining the web of the rim by which the wheel may be secured (by threaded fasteners, not shown) to the wheel hub assembly 10. Finally, the hollow body comprises a third part 20 forming a mere annular spacer which is closed by a cover 21 at its axial end remote from the second part 15, the cover and spacer being secured by threaded fasteners 22 to the second part 15.

Inside the second part 15 of the peripheral sidewall 12 of the hollow body of the wheel hub assembly 10 is formed a first compartment 23 which houses wheel drive reduction gear 24. Inside the third part 20 of the peripheral sidewall is formed a second compartment which is adjacent to the first compartment 23 and houses a brake mechanism 27.

In practice, and as shown, the first compartment 23 is separated from the second compartment 26 by an annular interior wall 28 which comprises a planetary pinion carrier for supporting the planet gears or pinions 29 of the wheel drive reduction gear 24 which comprises a planetary gearset and having a central opening 30 for the sun gear shaft 31 of the wheel drive reduction gear 24 to protrude into the second compartment 26, shaft 31 carrying a cylindrical ring 34 defining the braking member for the brake mechanism 27 housed in the second compartment 26.

An annular passageway 35 is left between the central opening 30 through the annular wall 28 and a sleeve or bush surrounding part of the sun gear shaft 31 of the drive reduction gear 24 through which the first and second compartments 23 and 26 normally communicate with each other.

The above arrangements are well known per se and their features are not part of the invention and therefore need not be described in greater detail. In particular the structure and operation of the reduction gear 24 and the brake mechanism 27 will not be described herein.

For improved axial or longitudinal circulation of the liquid lubricant between compartments 23 and 26, at least the portion of the inner surface of the peripheral wall of the hollow body that surrounds one of the compartments 23, 26 comprises at least a pair of longitudinally extending, oppositely sloping grooves 36A, 36B generally oblique with respect to the axis of the wheel hub assembly.

Preferably, the oppositely sloping grooves 36A, 36B are provided in the portion of the sidewall surrounding the second compartment 26 which houses the brake mechanism 27. The grooves 36A, 36B are therefore formed along the inner surface of the annular spacer defining the second part 20 of the sidewall 12 of the hollow body of the wheel hub assembly 10.

Figure 3:
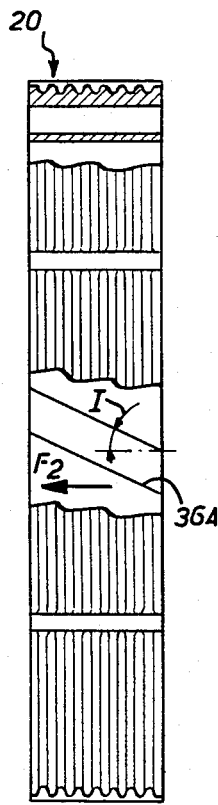
FIG. 3 shows a side elevational view, partly cutaway, of the component, seen from the rear, along line III—III in FIG. 2.
Figure 2:
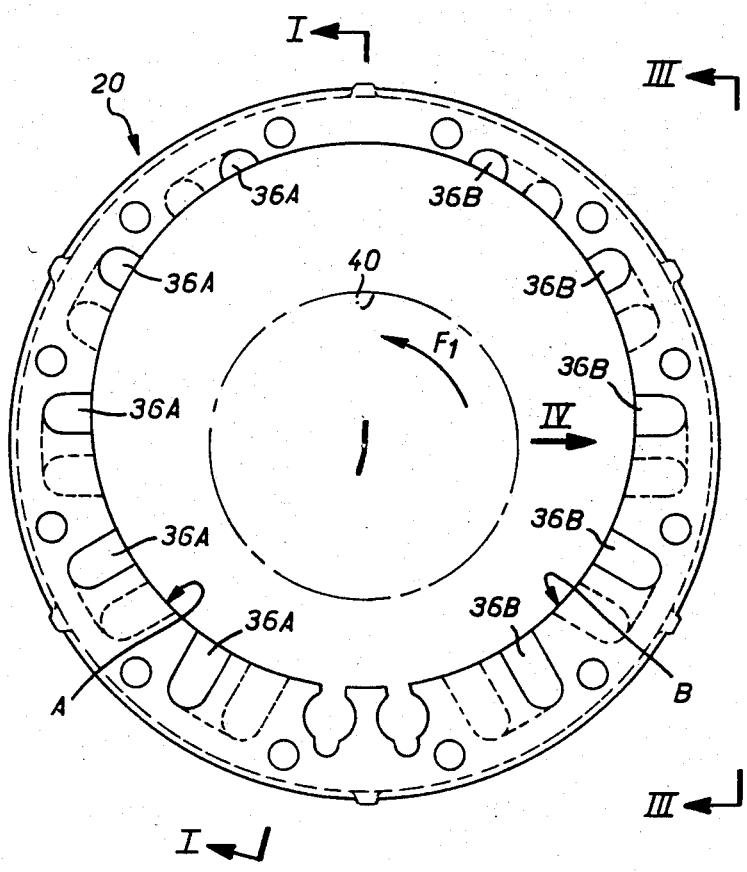
FIG. 2 shows an end elevational view taken in the direction of line II—II in FIG. 1, of one of the component parts of the hollow body of the wheel hub, taken on its own.
Figure 4:
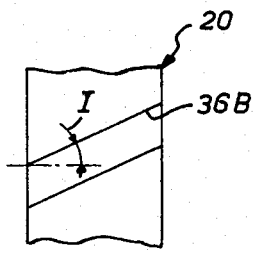
FIG. 4 shows a fragmentary side elevational view of the same component, seen from the interior, in the direction of arrow IV in FIG. 4.

According to the illustrated embodiment a plurality of pairs of oppositely sloping grooves 36A, 36B are provided on the inner surface of the annular spacer 20 and are arranged symmetrically to one another about an axis of symmetry (not marked). A first group of the grooves 36A slope in a first direction which is counterclockwise of the axis and are preferably circumferentially spaced along a semi-circumferential zone A of the inner surface of the annular spacer 20 and a second group of the grooves 36B slope in a second or opposite direction which is clockwise of the axis and are preferably circumferentially spaced along a semi-circumferential zone B, opposite zone A, of the inner surface of annular spacer 20 as shown in FIGS. 2 to 4.

In the illustrated embodiment there are five oblique grooves 36A sloping in the first direction and five oblique grooves 36B sloping in the opposite direction which are arranged in symmetrical pairs. In practice the slope of all the oblique grooves 36A is the same and the slope of all the oblique grooves 36B is also the same. Also in practice, the absolute value of the slopes of the oblique grooves 36A, 36B are the same though the senses are different. The slope may, for example, be between 20° and 25° relative to the axis of the wheel hub assembly and, in particular, about 23°.

In the illustrated embodiment the inner surface of the annular spacer 20 on which the oblique grooves 36A, 36B are formed is eccentric with respect to the outer surface of the annular spacer. It follows, however, in this case that the pairs of oblique grooves 36A, 36B are arranged symmetrically with respect to the axial plane of symmetry of the wheel hub assembly.

It goes without saying that, alternatively, when the inner surface of the annular spacer 20 is not eccentric the pairs of oblique grooves 36A, 36B are all of the same depth. Further, the grooves 36A, 36B are then arranged in symmetrical pairs with respect to the axis of the wheel hub assembly.

In any event, in operation, assuming the direction of rotation of the wheel hub assembly 10 is as indicated by arrow F1 in FIG. 2, the axial grooves 36A produce an axial flow of the liquid lubricant in the second compartments 26 in the direction F3 in FIG. 3, and the oppositely sloping grooves 36B produce an axial flow of the liquid lubricant in the opposite direction. Circulation of the liquid lubricant between the compartments 23 and 26 of the wheel hub assembly 10 is improved accordingly.

As will be readily understood the variation of the depth of the pairs of oblique grooves 36A, 36B as a function of their position facilitates the adaptation to the configuration of the liquid ring which forms, in operation, by centrifugation of the liquid in second compartment 26, which liquid ring is represented by the phantom line 49 in FIG. 2, centered on the axis of the wheel hub assembly.

To further contribute to the circulation of the liquid lubricant between compartments 23 and 26, channels 41A, 41B are preferably formed in the annular wall 28 provided between the two compartments, as schematically illustrated by chain-dotted lines in FIG. 1.

Finally, the present invention is not intended to be limited to the illustrated and disclosed embodiment but on the contrary is intended to cover all modifications and alternatives falling within the scope of the appended claims.

What I claim is:

1. A wheel hub assembly for heavy-duty vehicles, said wheel hub assembly comprising a hollow body adapted to contain a liquid lubricant and having a first compartment for housing a wheel drive reduction gear and a second compartment adjacent to said first compartment for housing a wheel brake mechanism, said hollow body including a sidewall, at least a portion of said sidewall which annularly surrounds one of said compartments has at least a pair of longitudinally extending, oppositely sloping generally oblique grooves defining means for longitudinally circulating the liquid lubricant between said compartments when said wheel hub assembly is in operation.

2. The wheel hub assembly of claim 1, wherein the oblique grooves of said pair of grooves are arranged symmetrically with respect to each other.

3. The wheel hub assembly of claim 1, wherein there are a plurality of oblique grooves, one groove of each of said pairs sloping in a first direction and the other groove of each of said pairs sloping in an opposite direction, said one grooves being spaced circumferentially along a first semi-circumferential zone and said other grooves being spaced circumferentially along a second semi-circumferential zone opposite said first semi-circumferential zone.

4. The wheel hub assembly of claim 1, wherein said second compartment is surrounded by said portion of said sidewall of said hollow body.

5. The wheel hub assembly of claim 4, wherein an annular interior separates said first and second compartments and comprises a planetary pinion carrier of a planetary gearset comprised by said wheel drive reduction gear, channels being formed in said annular interior wall in alignment with said oblique grooves for carrying lubricant between said oblique grooves and said first compartment.

6. The wheel hub assembly of claim 1, wherein the inner surface of said sidewall is eccentric with respect to the outer surface thereof, and the depth of the oblique grooves varies according to their circumferential position.

7. A wheel hub assembly of claim 1, wherein one of said pair of oblique grooves slopes clockwise and the other of said pair of oblique grooves slopes counterclockwise.

* * * * *